US006676888B2

(12) United States Patent
Mansell

(10) Patent No.: US 6,676,888 B2
(45) Date of Patent: Jan. 13, 2004

(54) SWIVEL BASE TILTING ROTARY FURNACE

(76) Inventor: George E. Mansell, P.O. Box 2428, Muscle Shoals, AL (US) 35662

( * ) Notice: Subject to any disclaimer, the term of this patent is extended or adjusted under 35 U.S.C. 154(b) by 78 days.

(21) Appl. No.: 09/944,730

(22) Filed: Sep. 1, 2001

(65) Prior Publication Data

US 2002/0074700 A1 Jun. 20, 2002

Related U.S. Application Data

(60) Provisional application No. 60/180,507, filed on Feb. 5, 2000, and provisional application No. 60/279,342, filed on Mar. 28, 2001.

(51) Int. Cl.7 .............................. C21B 7/12; C21C 5/42
(52) U.S. Cl. ......................... 266/45; 266/213; 266/244
(58) Field of Search ................................. 266/213, 244, 266/173, 44, 45; 432/103

(56) References Cited

U.S. PATENT DOCUMENTS

| 2,767,971 A | * | 10/1956 | Hofmeister et al. | ......... | 266/213 |
| 4,394,166 A | | 7/1983 | Kennedy | ..................... | 75/65 R |
| 4,697,792 A | * | 10/1987 | Fink | ............................ | 266/248 |
| 5,470,376 A | * | 11/1995 | Dube et al. | ..................... | 75/672 |
| 5,900,039 A | * | 5/1999 | Kos | ............................. | 75/672 |
| 6,213,763 B1 | * | 4/2001 | Slade et al. | ................. | 432/103 |
| 2002/0090018 A1 | * | 7/2002 | Zebedee et al. | .............. | 373/71 |

* cited by examiner

Primary Examiner—Scott Kastler
(74) Attorney, Agent, or Firm—David A. Greenlee

(57) ABSTRACT

A method of, and apparatus for, recycling a metal by melting it to remove it from metal-containing scrap through the use of a tiltable, swivel rotary furnace, which is swiveled to a first station for receiving metal-containing scrap, tilted back and rotated while heating to melt the metal, swiveled to a second station where it is stopped and forward tilted to quickly pour off the molten metal into a holding apparatus. The furnace is swiveled to a third station where it is further forward tilted and rotated to discharge the residual scrap, and then leveled and swiveled to the first station while still hot to receive metal-containing scrap, thereby reducing the amount of energy required to reheat the furnace to melting temperature. The furnace comprises a hollow elongated drum having a tapered snout, a door closing the front opening, a power rotary drive to rotate the drum, which is mounted for tilting about a transverse axis, and for swiveling about a vertical axis, and a heater.

4 Claims, 16 Drawing Sheets

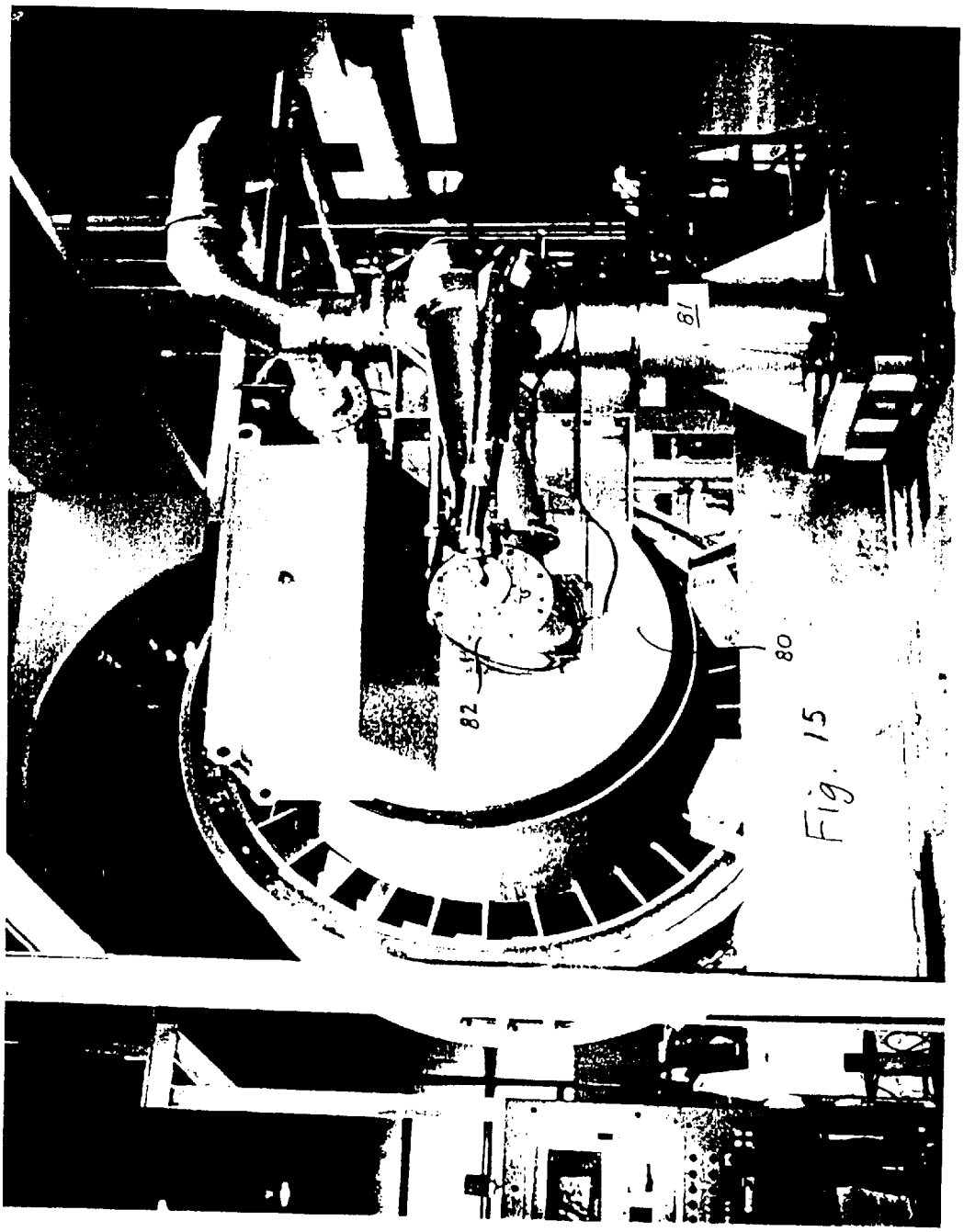

SWIVEL BASE TILTING ROTARY FURNACE

CROSS-REFERENCE TO RELATED APPLICATIONS

Provisional Patent Application No. 60/180507, filed Feb. 5, 2000, and No. 60/279342, filed Mar. 28, 2001, both entitled Swivel Base Tilting Rotary Furnace.

TECHNICAL FIELD

This invention relates to melting furnaces and, more particularly, to a rotary scrap melting furnace that tilts and swivels.

BACKGROUND OF THE INVENTION

Known processes are used to recover a metal, such as aluminum, from scrap containing that metal plus other substances. One such metal recovered is aluminum, which is used extensively in conjunction with iron, such as in engine blocks. It is usual to comminute the scrap and to heat it in a hearth furnace, which is heated to a temperature in range of 1400° F. to 2000° F. to melt the aluminum but not the iron or other substances.

At the end of the melting cycle, gates are opened to flow off the molten aluminum. The remaining scrap must then be manually removed or raked out of the melting chamber to prepare for another charge of scrap. The scrap removal operation is inefficient and overly long, which limits the cost effectiveness of the aluminum extraction process.

One advance in this process was the use of a rotary furnace in which a hollow drum is fitted for power rotation. Scrap is introduced through a front opening in the drum, which is then closed by a door. A rear burner is activated to melt the aluminum while the drum is rotated. The drum is also fitted for tilting about a transverse axis. It is tilted rearward to discharge the molten aluminum through a door, then is tilted forward to discharge the residual scrap materials. Such a rotary melting furnace is shown in U.S. Pat. No. 4,697,792—Fink. Such an arrangement is characterized by moving scrap wagons to and from the furnace, and moving receptacles for the molten aluminum to the furnace. The apparatus disclosed in this patent improves cycle time over the hearth melting method, but employs a cumbersome apparatus.

It would be desirable to provide a melting furnace and system that markedly improves cycle time.

SUMMARY OF THE INVENTION

It is therefore an object of this invention to provide a melting furnace and system that markedly improves cycle time.

The melting furnace and system of this invention is useful to rapidly process scrap that contains any of a plurality of metals which can be extracted from the scrap. Such metals include aluminum, zinc, lead, copper and brass. Any type of scrap can be processed without pre-processing comminution through a hammer mill or scrap chopper.

In one aspect, this invention features a rotary furnace for melting a metal containing scrap to separate and remove that metal from the residual scrap. The furnace comprises a hollow elongated drum having a circular body having a snout which tapers toward a reduced diameter front opening that is sized to receive and discharge uncomminuted metal-containing scrap. A door for closing the front opening is mounted for swinging movement to open and close the front opening. A power rotary drive rotates the drum about its longitudinal axis, while the drum is mounted on a base for tilting about a transverse axis by power tilters. The base is mounted for swiveling movement by a power swivel drive about a vertical axis to swivel the drum between a plurality of circumferentially-spaced operating stations. A heater is provided for heating the scrap in the drum.

In another aspect, the furnace of this invention features a drum which is charges with scrap through the opening, the molten metal is discharged through the opening and the residual scrap is discharged through the opening. Each of these operations occurs at discrete operating stations between which the drum is swiveled.

Preferably, the drum snout has a taper of about 15°, which enables a controlled discharge of the molten metal.

Another feature of this invention is that the drum is level when charged with scrap, is tilted backward about 20° and rotated for melting, is tilted forward about 24° and stopped to pour out the molten metal, and is tilted forward about 24° and rotated to discharge the residual scrap.

In a further aspect, the drum interior is faceted to enhance tumbling of scrap during rotation, which aids in discharge of the residual scrap.

In a broader sense, this invention features the use of the swivel tiltable rotary drum furnace in a system that includes a scrap charging machine at a charging station for charging the furnace with scrap, a molten metal pouring station which can use a crucible, a holding/melting furnace or sows, and a discharging station for discharging the residual scrap. Also included is a furnace hood for collecting furnace air containing smoke and pollutants, a ventilation system for evacuating the furnace air, and a baghouse for removing pollutants and particulate matter from the evacuated air.

A yet further aspect of this invention features a method of recycling a metal by melting it to remove it from metal-containing scrap a tiltable, swivel rotary furnace. The method comprises the steps of providing such a furnace, swiveling the furnace to a first station for receiving metal-containing scrap, tilting back and rotating the furnace while heating to melt the metal, swiveling the furnace to a second station where the furnace is stopped and forward tilted to quickly pour off the molten metal into a holding apparatus, swiveling the furnace to a third station where the furnace is further forward tilted and rotated to discharge the residual scrap, and leveling and swiveling the furnace to the first station while still hot to receive metal-containing scrap, thereby reducing the amount of energy required to reheat the furnace to melting temperature.

These and other objects and features of this invention will become more readily apparent upon reference to the following detailed description of a preferred embodiment, as illustrated in the accompanying drawings, in which:

BRIEF DESCRIPTION OF THE DRAWINGS

FIG. 15 is a perspective view of a tilting rotary furnace of the type used in this invention.

DESCRIPTION OF THE PREFERRED EMBODIMENT

Figure 1:
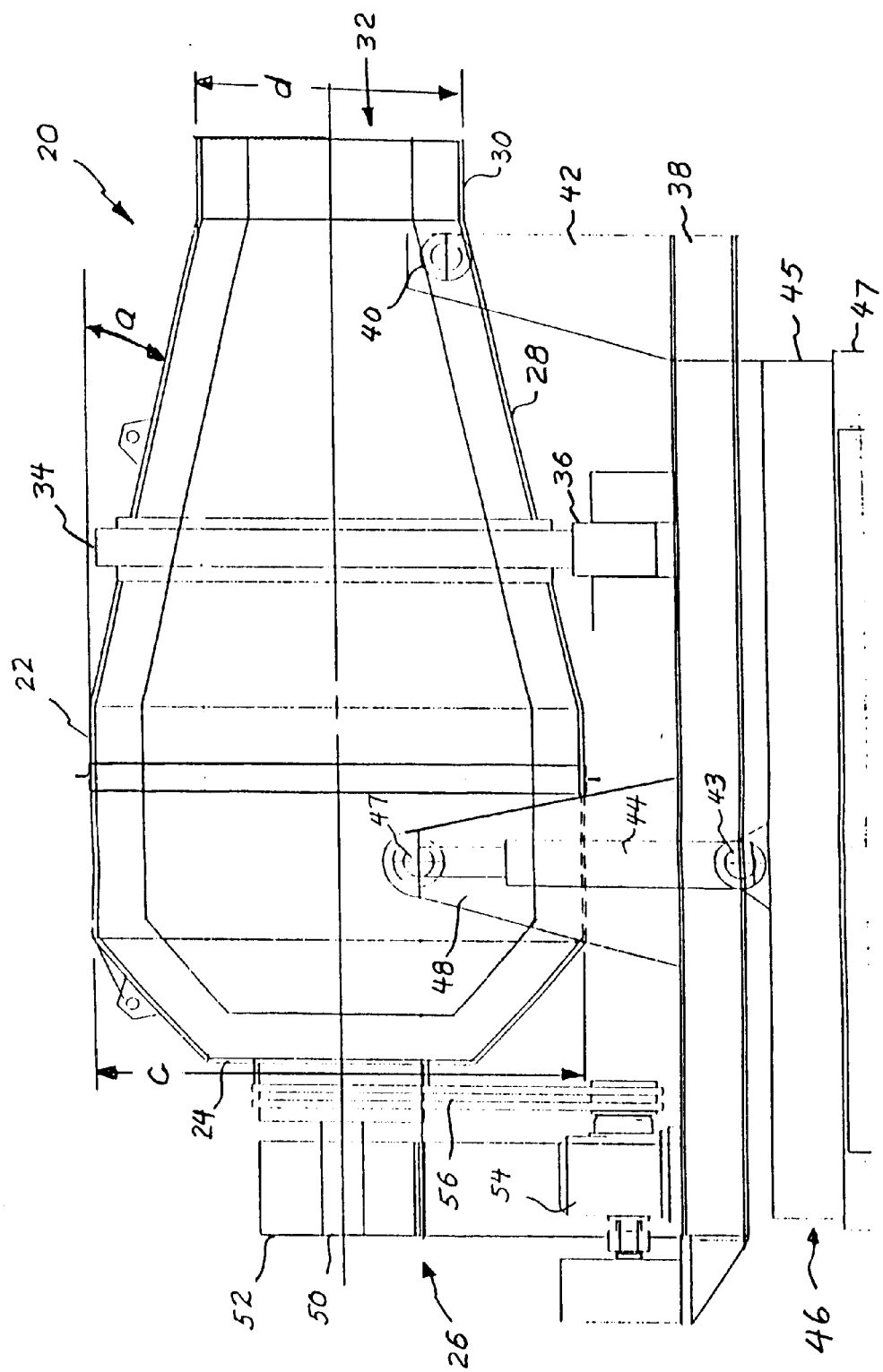
FIGS. 1, 2 and 3 show a tilting rotary furnace of this invention in three different tilting attitudes.
Figure 2:
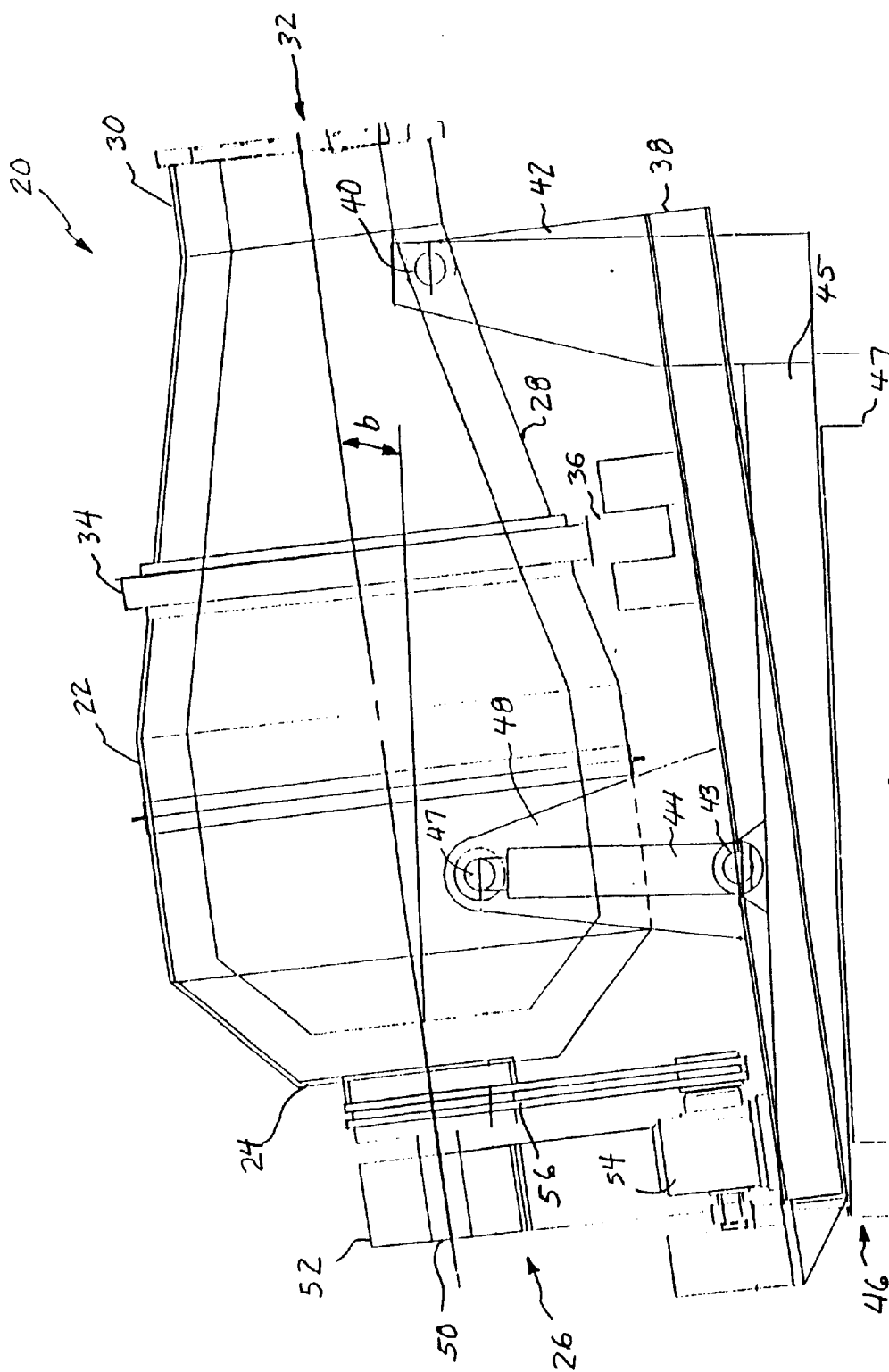
Figure 3:
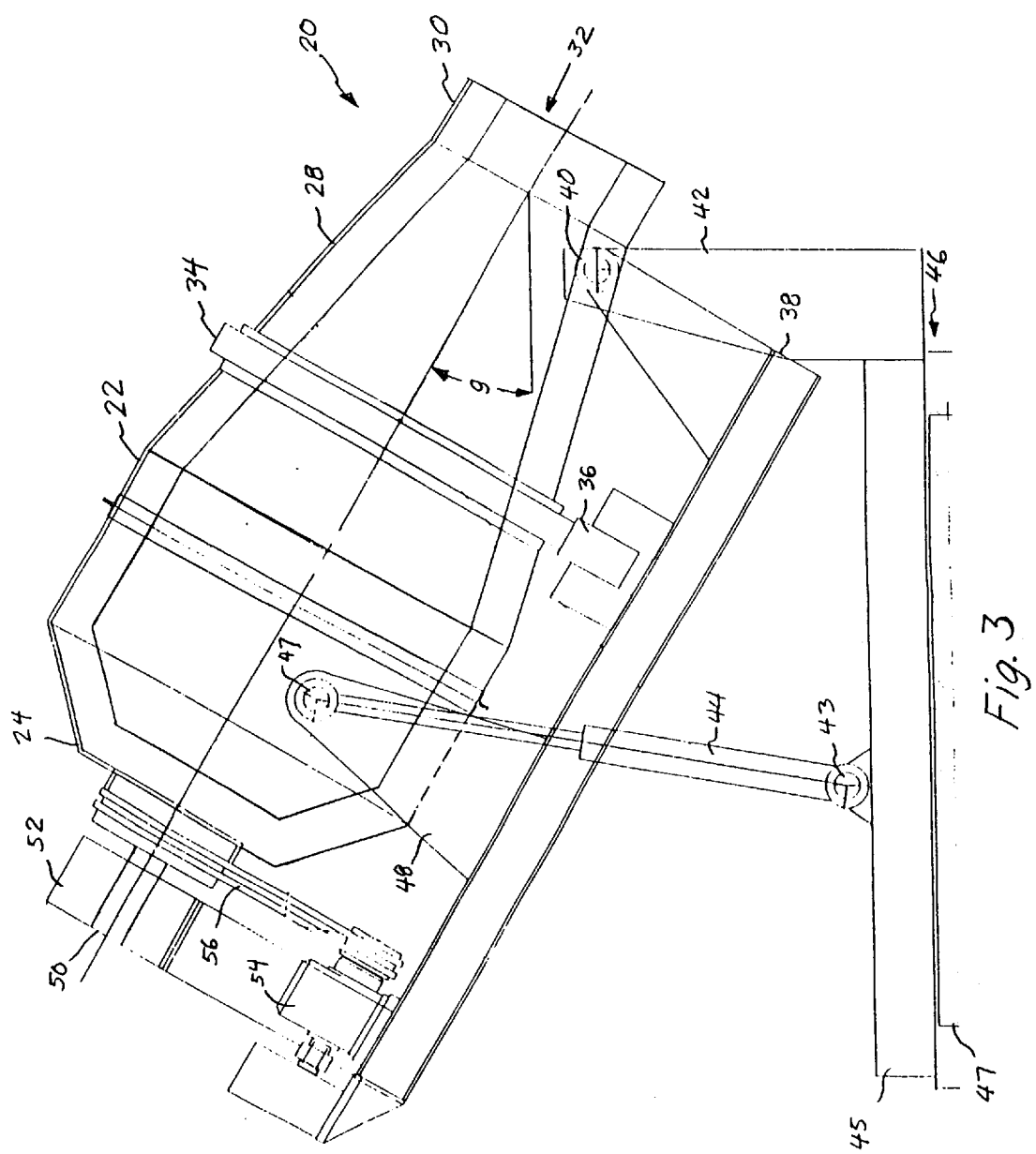

Referring to FIGS. 1–3, a rotary furnace 20 includes a drum 22 having a rear end 24, which includes a drive mechanism 26. Drum 22 has a snout 28 that tapers forwardly at an angle a to a collar 30 which defines an opening 32 for transferring scrap into drum 22 and pouring molten metal and residual scrap out. Drum 22 has a drive ring 34 that is mounted for rotation on a system of rollers 36 that are mounted on a platform 38, which is pivoted at 40 to a stanchion 42. Hydraulic cylinders 44 that are pivotally mounted at 43 on a base 46 are pivotally attached at 47 to a stanchion 48 that is mounted on platform 38. Cylinders 44 are operable to tilt platform 38 and drum 22 back (FIG. 2) and forward (FIG. 3). Drum rear end 24 mounts a shaft 50 that is journaled in a support 52 on platform 38 and, with rollers 36, support drum 22 for rotation by a motor 54 and chain drive 56.

Drum 22 can be configured to have any capacity from 10,000 lb. to 50,000 lb. of metal, and has a snout taper a, a major diameter c, a collar diameter d, a length e, and a collar length f. In one exemplary configuration, drum 22 is sized to melt 25,000 lb. of aluminum and has the following dimensions:

a—15°
c—12 ft.
d—7.5 ft.
e—22 ft.
f—1.5 ft.

In operation, drum 22 is charged with the metal-containing scrap in the FIG. 1 level position. A door is closed, as later described, and the furnace is tilted back an angle b to the FIG. 2 position, rotated up to 6 rpm and heated for a period of time to melt the metal. The actual time depends on the size of the charge, the amount of meltable metal in the scrap charge, and the initial temperature of the drum. Tilt angle b is in the range of 17°–20°.

When the metal is molten, the door is removed, and drum 22 is stopped and tilted forward to an angle g, as in FIG. 3, to discharge the molten metal into a receptacle, such as a crucible, a holding furnace, or into sows. Tilt angle g is in the range of 22°–24°. After all molten metal is poured, drum 22 is rotated in the forward tilt position to discharge the residual scrap into a receptacle. The drum preferably has a faceted refractory cast lining comprising 12 flat shapes. This facilitates residual scrap removal by agitation during rotation. Drum 22 can then be leveled to receive a new charge of scrap.

The gentle taper of snout 28 enables precise control of pouring of the molten metal. The collar can be lengthened or shortened, depending on the configuration of the system employed. It functions to enable pouring of the molten metal outside the furnace confines.

Figure 4:
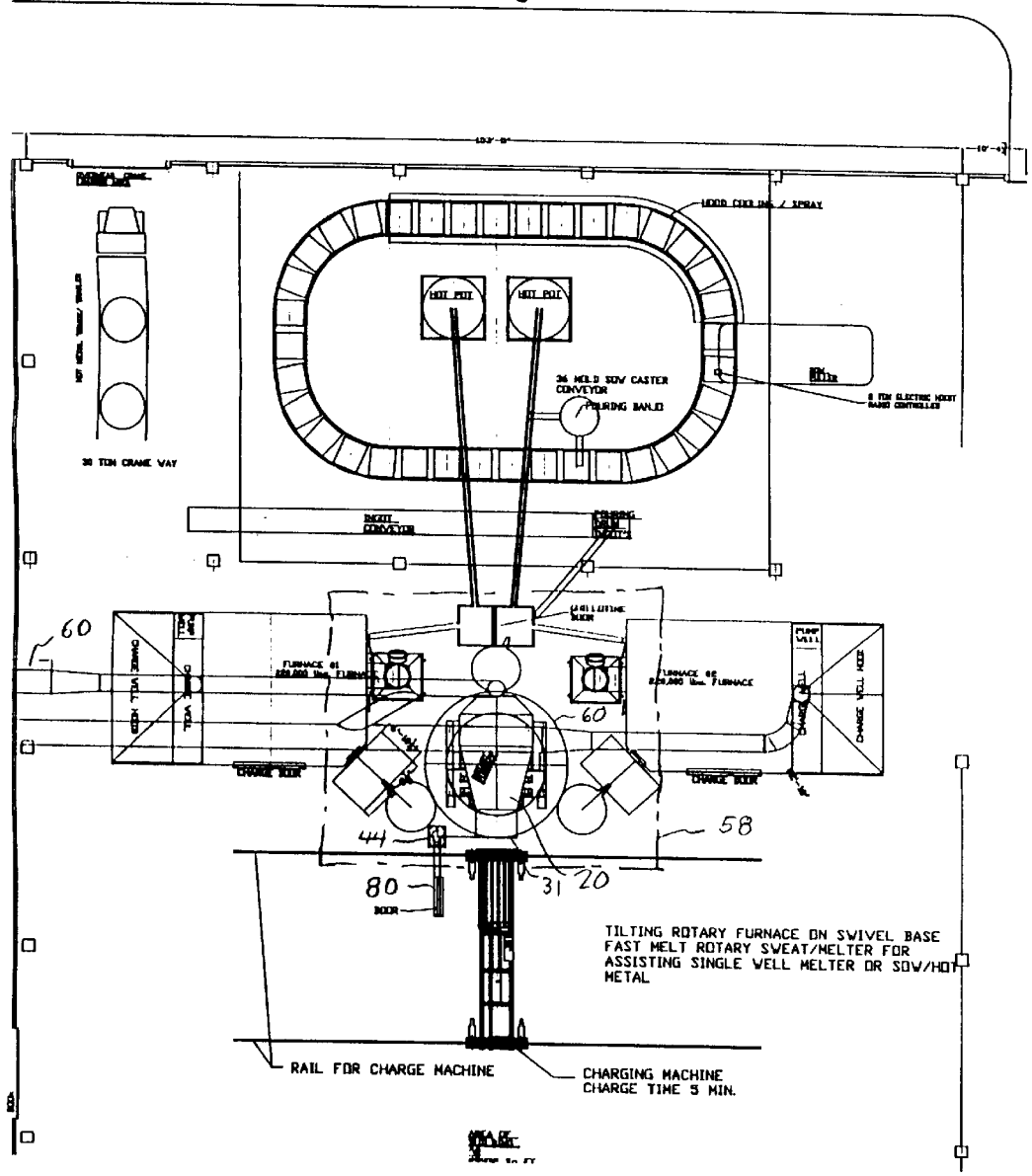
FIGS. 4, 5, and 6 illustrate a system for melting metal-containing scrap, according to this invention, which utilizes a swivel tilting rotary furnace.
Figure 5:
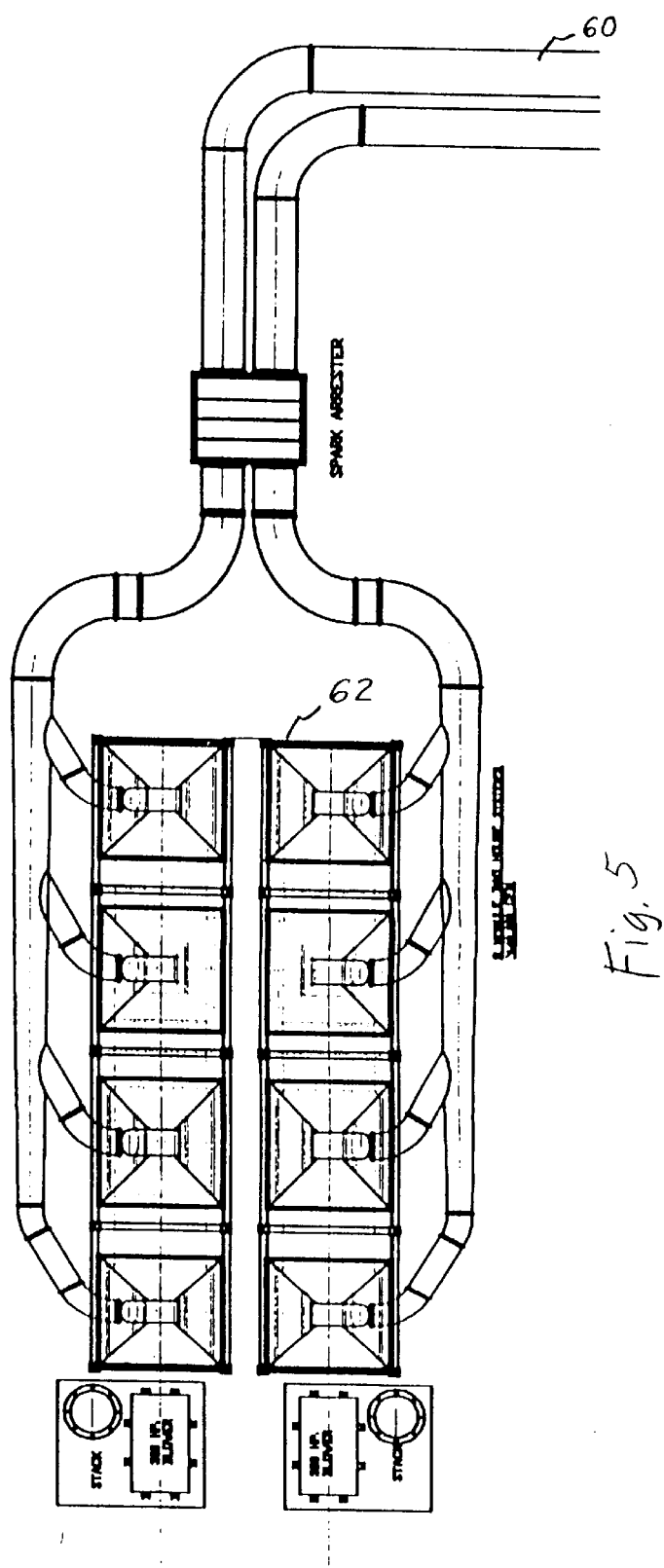
Figure 6:
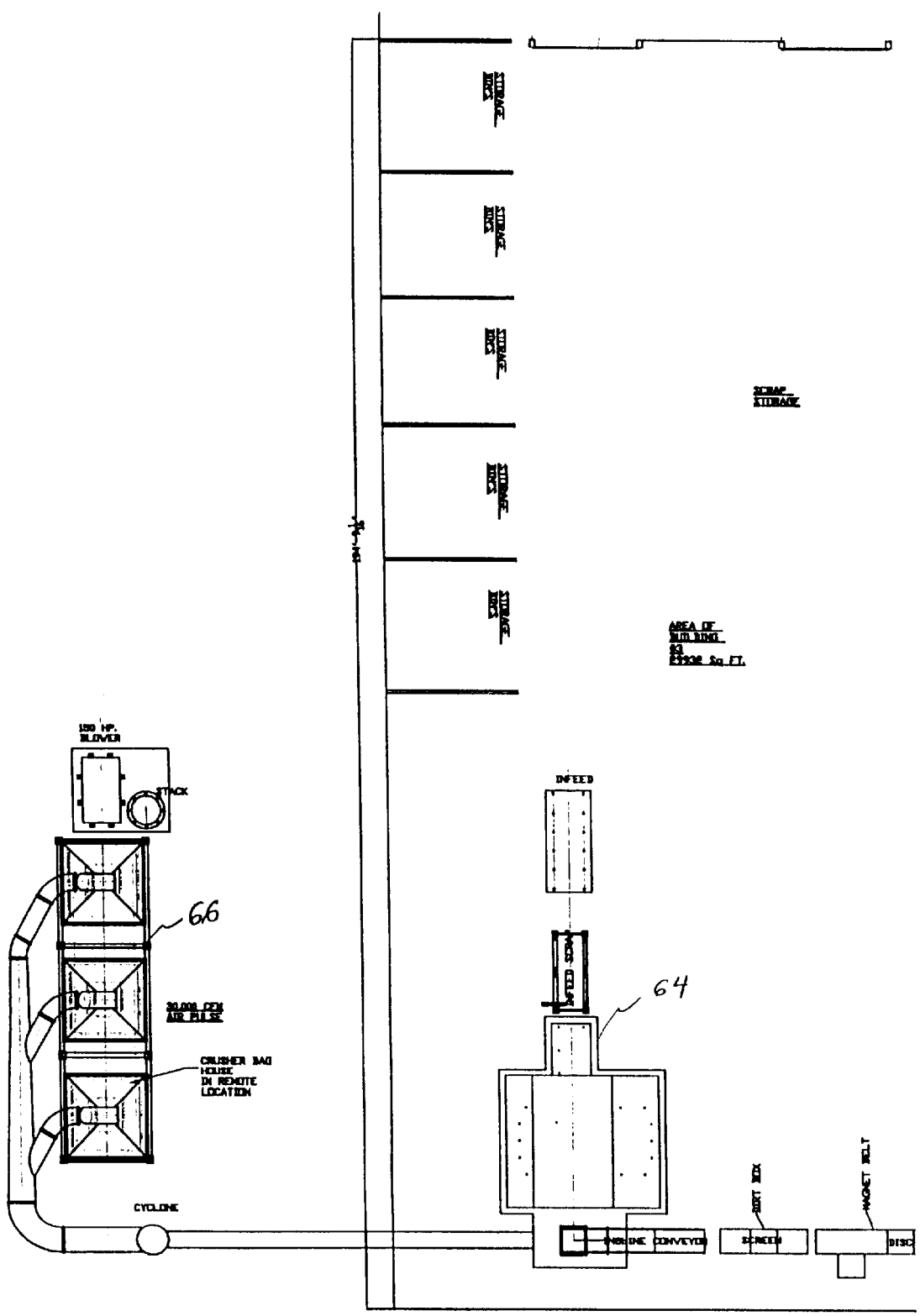
Figure 7:
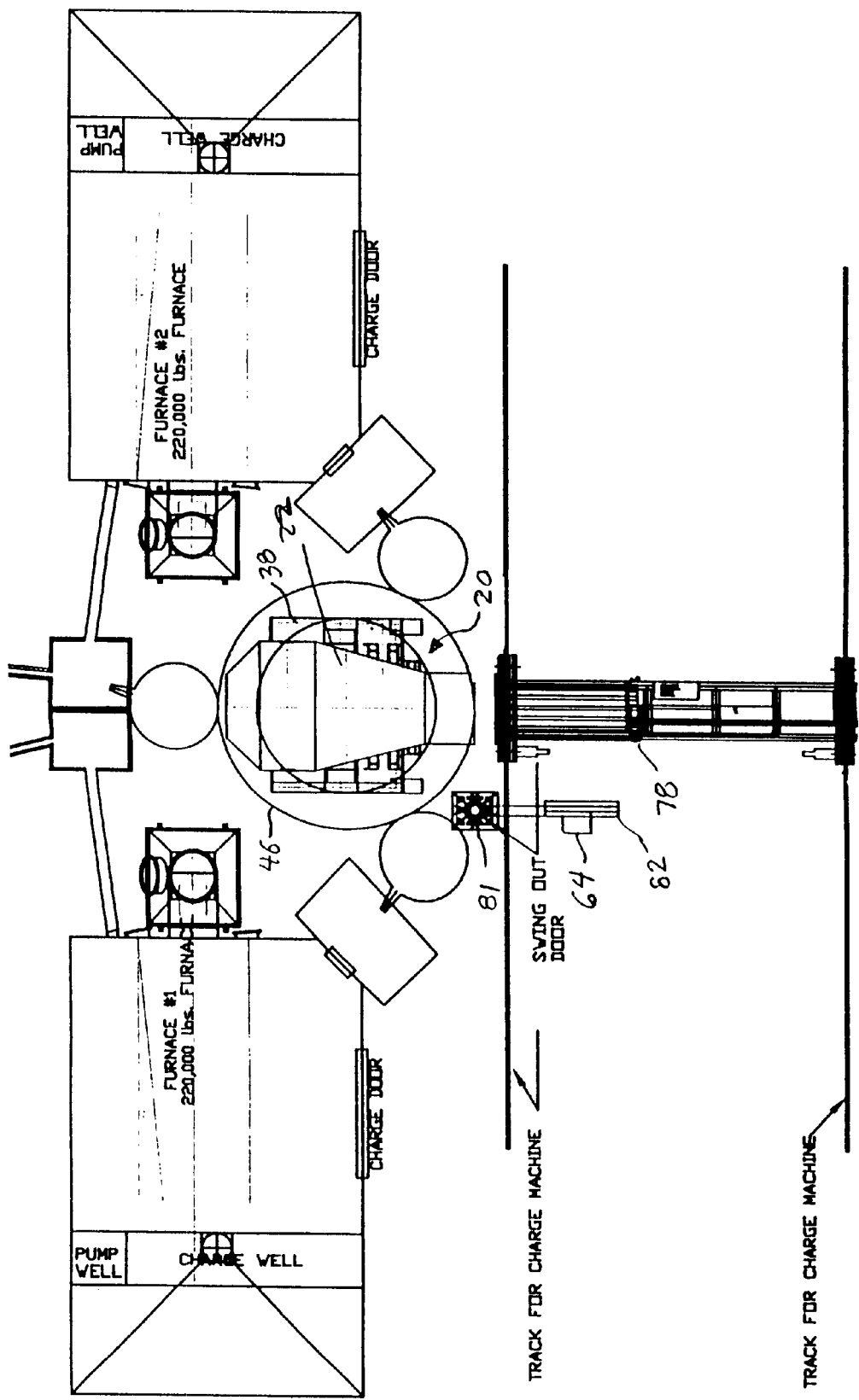
FIGS. 7, 8, 9, and 10 illustrate the pouring of molten metal from the furnace into a variety of receptacles at different stations.
Figure 8:
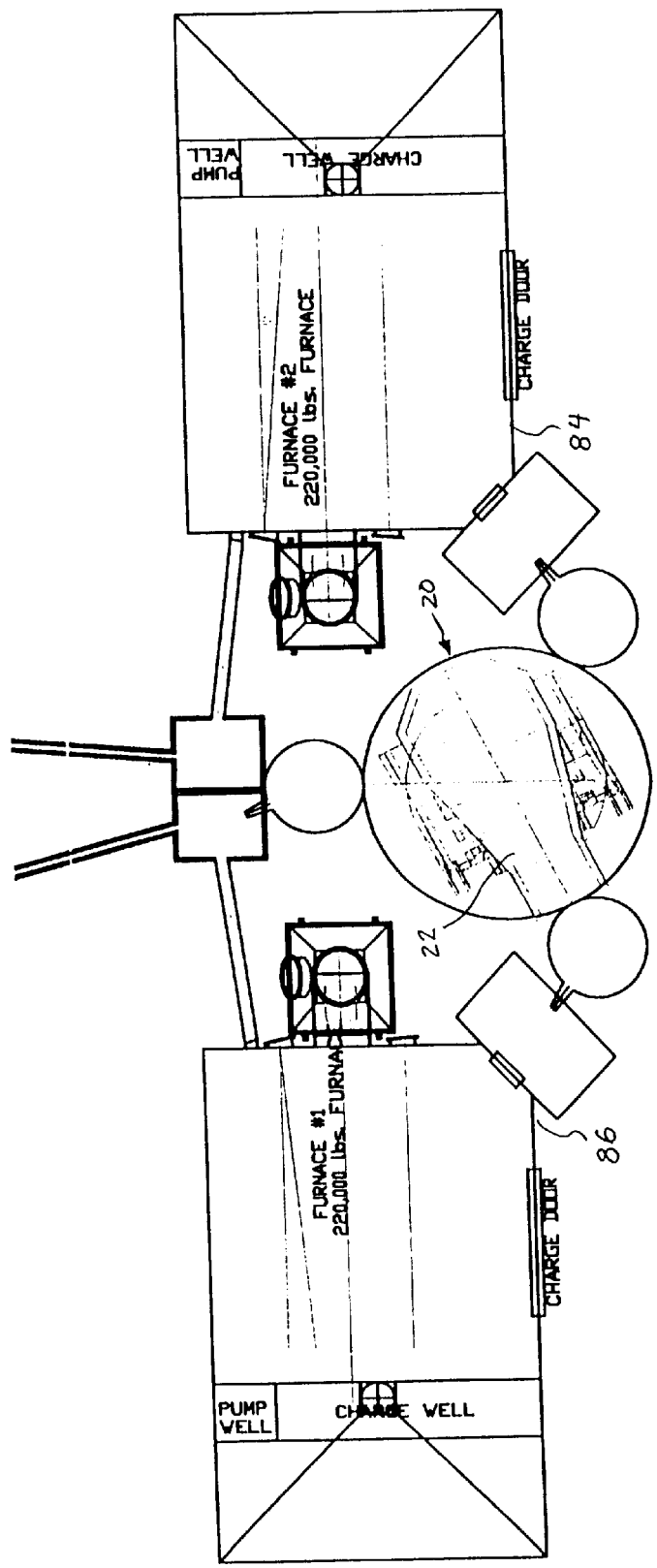
Figure 9:
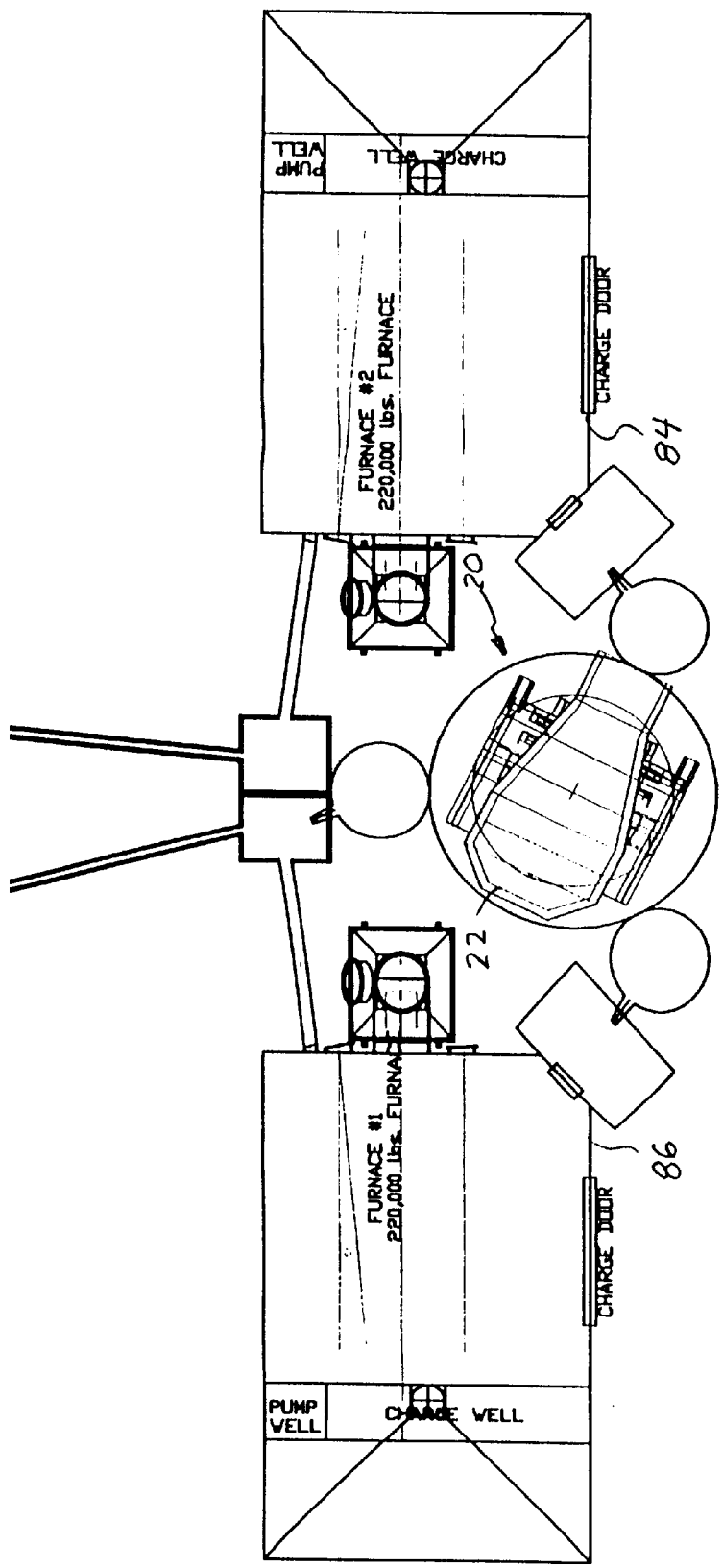
Figure 10:
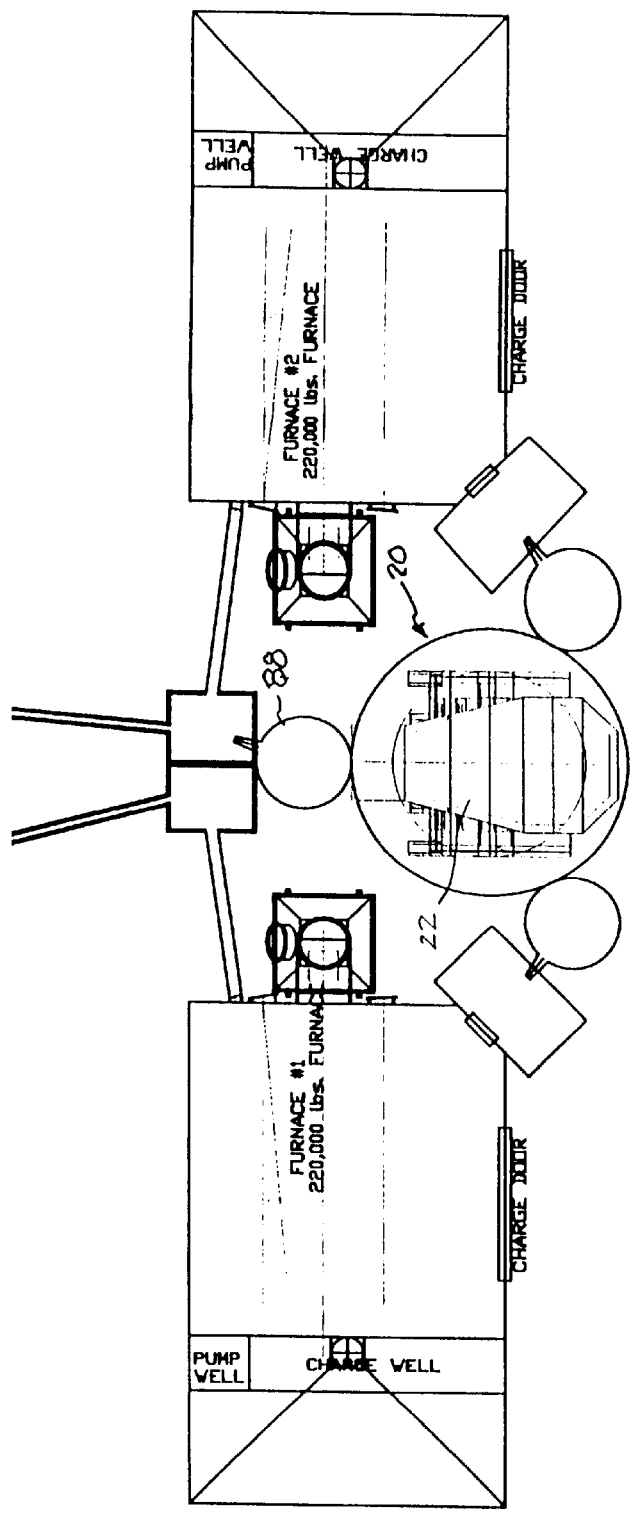
Figure 11B:
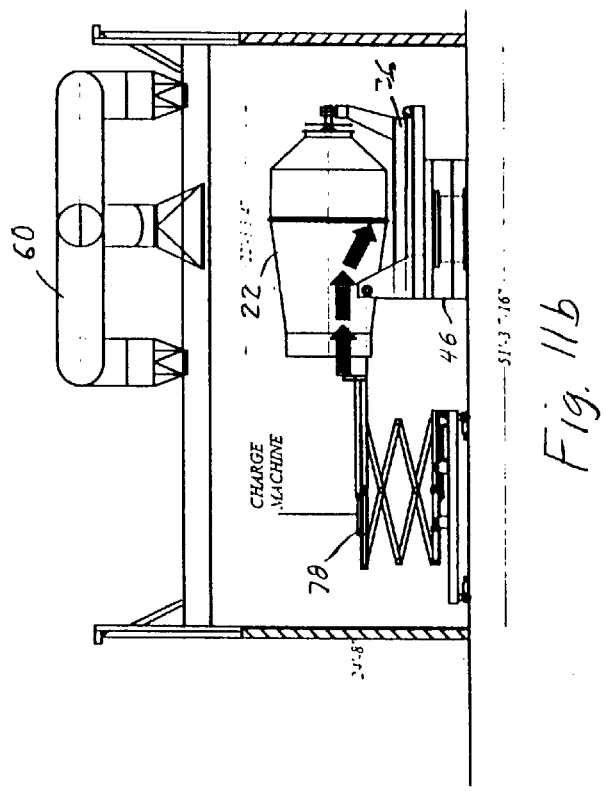
FIGS. 11*a*, 11*b*, 12*a*, 12*b*, 13*a*, 13*b*, 14*a* and 14*b* illustrate operation of the furnace in the system of FIGS. 4, 5, and 6, showing various options of pouring the molten metal.
Figure 11A:
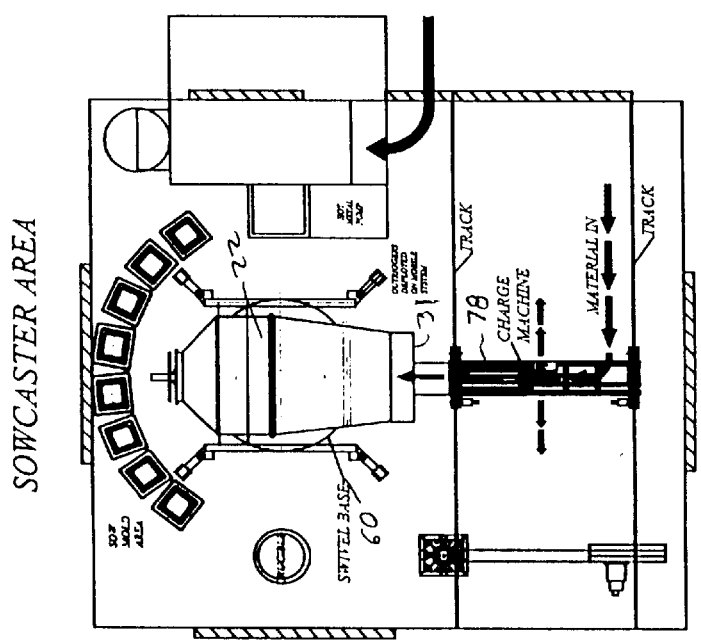
Figure 12B:
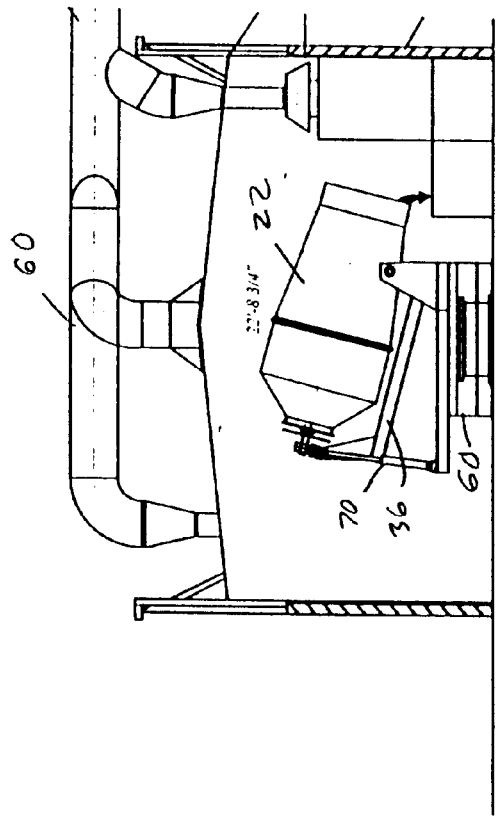
Figure 12A:
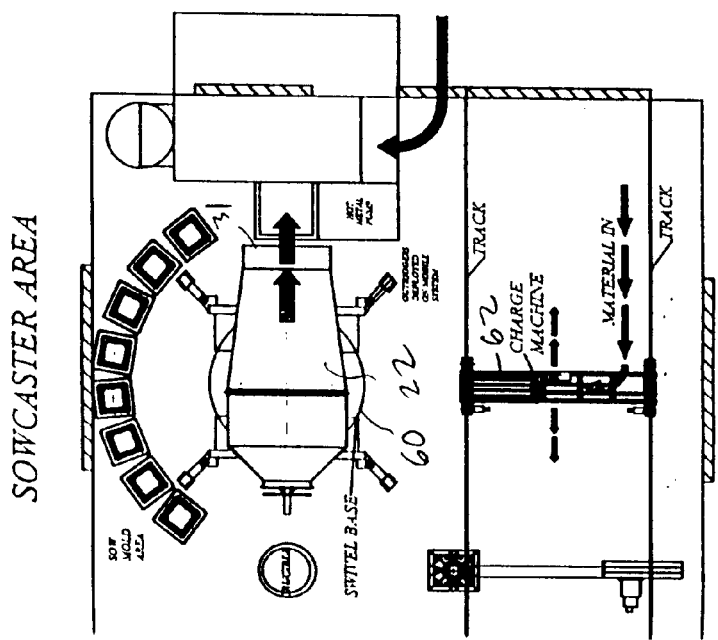
Figure 13B:
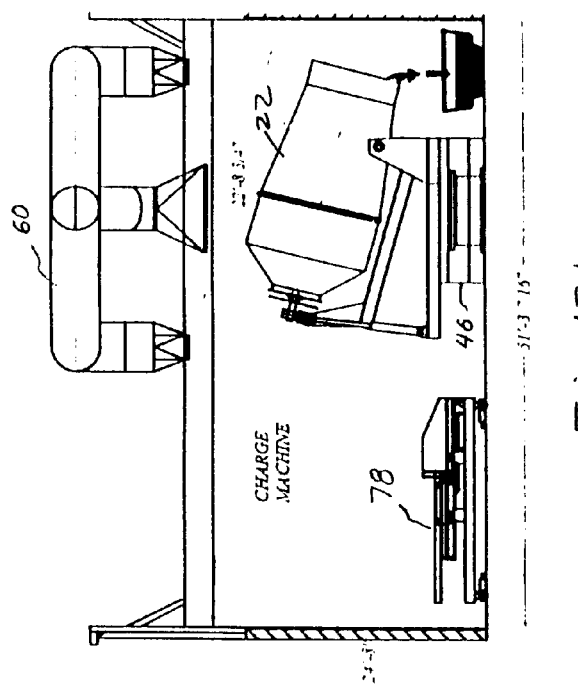
Figure 13A:
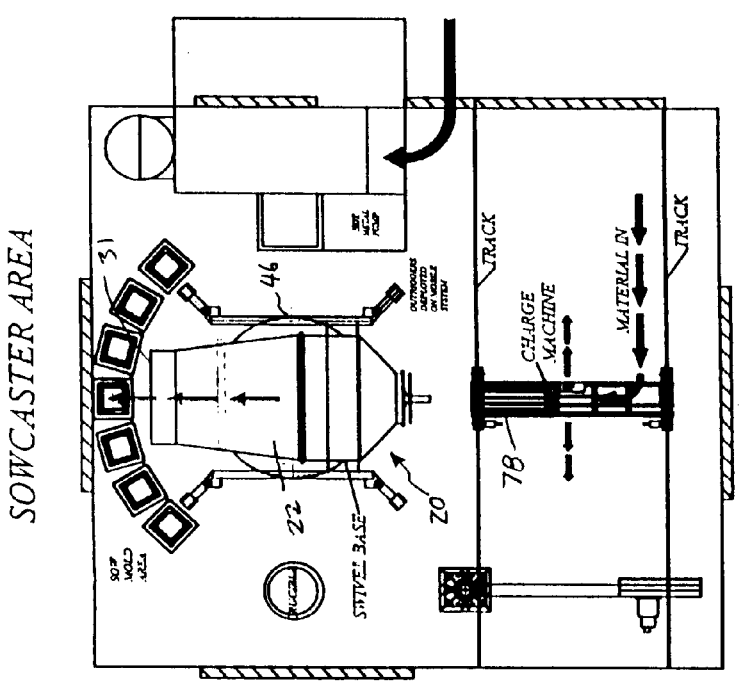
Figure 14B:
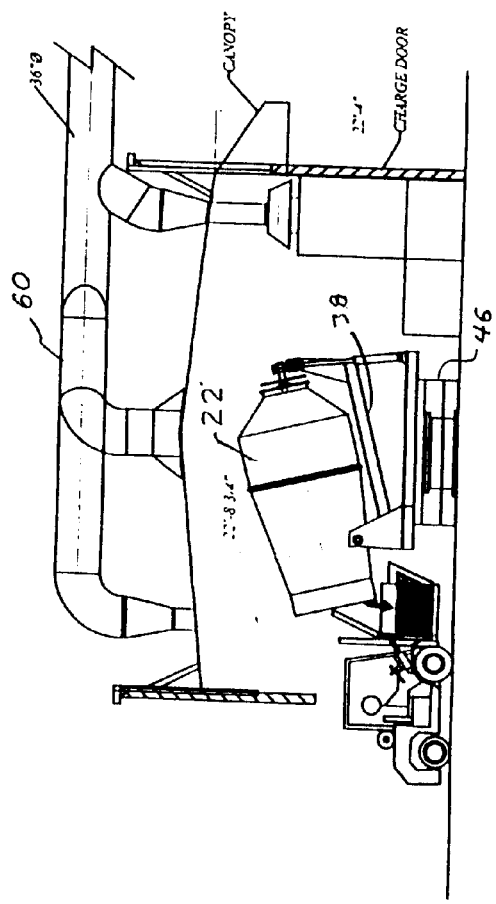
Figure 14A:
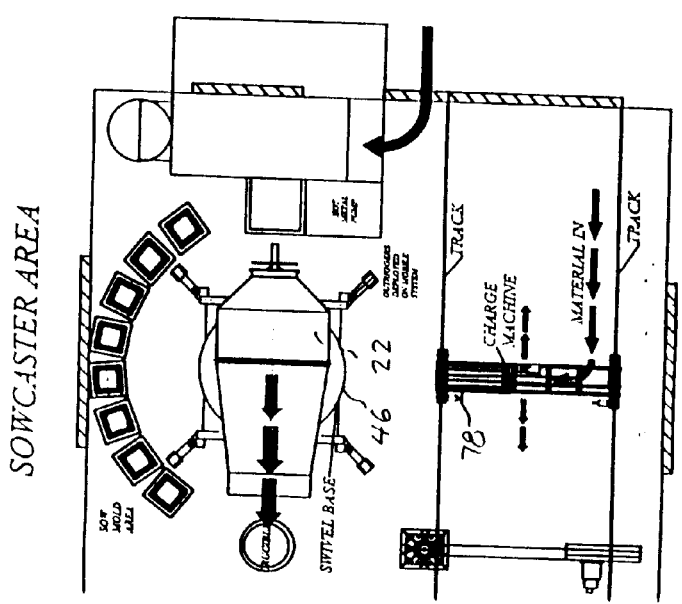

FIGS. 4–6 provide an overview of the scrap melting system. Rotary furnace 22 is and platform 38 are mounted on base 46 for rotation, as will be later described, under an exhaust hood 58 to collect air containing smoke and particulates, which are produced during scrap melting and handling, that are evacuated through ducting 60 to a baghouse 62 (FIG. 5). Scrap is provided by a scrap processor 64 that has its own air exhaust processing system 66.

Figure 16:
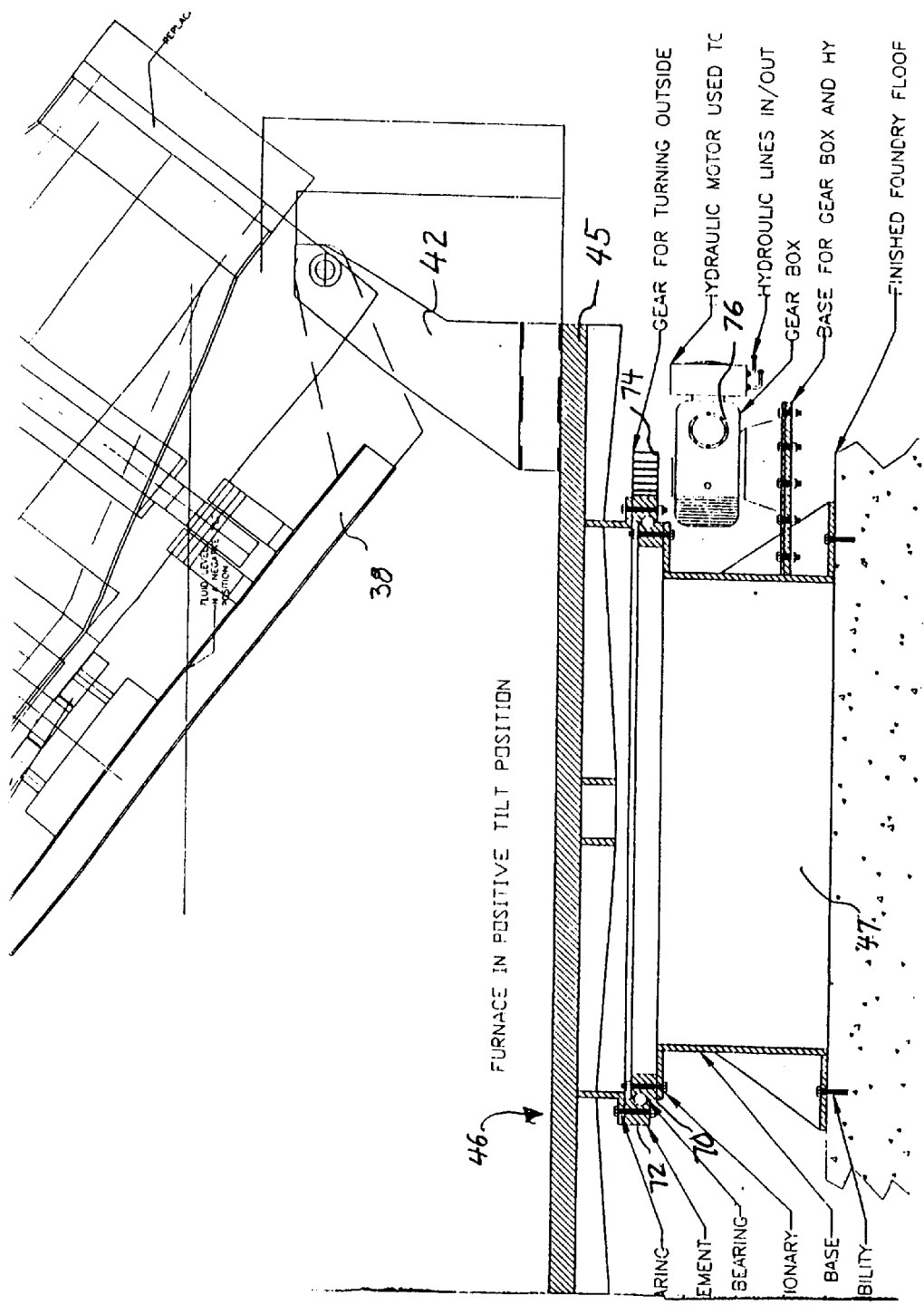
FIG. 16 is a partial side sectional view of the rotary furnace of this invention, showing details of the swivel bearing.

As shown in FIG. 16, platform 38 is supported on the upper portion 45 of base 46 via a rotary Avon bearing 70 that is mounted on base upper portion 45. A spur gear 74 is carried by the lower portion 47 of base 46 and engages a drive pinion 74 that is rotated by a hydraulic drive motor 76. Thus, operation of hydraulic motor 76 rotates furnace 20 and its drum 22 between operating stations, as will now be described.

FIGS. 7–10 illustrate operation of the swivel rotary tilt furnace and the metal processing and recovery system of this invention. In the charging position of FIG. 7, the mouth 32 of drum 22 is aligned with a rail-mounted scrap charger 78, which was preloaded with a predetermined scrap charge, and the scrap is inserted into drum 22. A door 80 is then swung closed on its support 81. In a preferred embodiment, door 80 mounts a heating unit 82, as shown in FIG. 15, which is then fired up to heat the scrap charge to a temperature in the range of 1400° F.–2000° F. to melt the metal, such as aluminum, after the drum 22 is tilted back, as previously described.

After the metal is molten, door 80 is swung open and furnace 20 is swiveled (or indexed) to a desired pouring position. These can be to alignment with intake runners for holding furnaces 84, 86, as in FIGS. 8 and 9, or to a sow casting machine input runner 80, as in FIG. 10. Thereafter, drum 22 is indexed to a position (not specifically illustrated) to discharge the residual scrap by tilting and rotating drum 22. FIGS. 11a, 11b, 12a, 12b, 13a, 13b, 14a and 14b further illustrate the operation just described.

The integration of the scrap processing and charging, the smoke and air exhaust and processing, the swivel indexing of the tilting rotary furnace provide numerous benefits which reduce cycle time and increase throughput and, thus efficiency. Such a system can double production versus an conventional rotary furnace. It enables molten metal to be poured off the scrap quickly, which keeps contamination of the metal by the heated residual scrap (e.g. iron contamination of aluminum) to a minimum. The rapid cycling enables the furnace to be re-charged while hot, thus saving energy required to heat the scrap.

While only a preferred embodiment has been described and shown, obvious modifications are contemplated within the scope of this invention, as defined by the following claims.

I claim:

1. A method of recycling a metal by melting it to remove it from metal-containing scrap through the use of a tiltable, swivel rotary furnace, comprising the steps of providing such a furnace, swiveling the furnace to a first station for receiving metal-containing scrap, tilting back and rotating the furnace while heating to melt the metal, swiveling the furnace to a circumferentially-spaced second station, stepping the furnace and forward tilting the furnace to quickly pour off the molten metal into a holding apparatus, swiveling the furnace to a circumferentially-spaced third station, further forward tilting and rotating the furnace to discharge the residual scrap, and leveling and swiveling the furnace to the first station while still hot to receive metal-containing scrap, thereby reducing the amount of energy required to reheat the furnace to melting temperature.

2. A system for recycling a metal by melting it to remove it from metal-containing scrap, comprising a rotary furnace for melting a metal-containing scrap to separate and remove that metal from the residual scrap, comprising a hollow elongated drum having a drawer body and a snout which tapers toward a reduced diameter front opening that is sized receive and discharge uncomminuted metal-containing scrap, a door for closing the front opening mounted for swinging movement to open and close the front opening a power rotary drive to rotate the drum about its longitudinal axis, a power titer for tilting the furnace about a transverse axis, means mounting the base for swiveling movement about a vertical axis, power swivel drive means for swiveling the drum between a plurality of circumferentially-spaced operating stations, a heater for heating the strap in the drum, said power tilters being mounted for swiveling movement with said drum to enable tilting of the drum in any of said operating stations, a scrap charging machine positioned at a first said operating station to charge the furnace with scrap, a molten metal pouring station located at a circumferentially-spaced second said opening station for receiving molten metal from the furnace, and a discharging station located at a circumferentially-spaced third said operating station for receiving residual scrap discharged from the furnace.

3. The system of claim 2, wherein the pouring station comprises one of a crucible, a holding/melting furnace, or sows.

4. The system of claim 2, further including a furnace hood for collecting furnace air containing smoke and pollutants, a ventilation system for evacuating the furnace air, and baghouse for removing pollutants and particulate matter from the evacuated air.

* * * * *